July 10, 1951

R. E. SHRADER 2,560,256

RECORDING VOLT METER

Filed May 26, 1948

INVENTOR
ROSS E. SHRADER
BY
ATTORNEY

Patented July 10, 1951

2,560,256

UNITED STATES PATENT OFFICE 2,560,256

RECORDING VOLTMETER

Ross E. Shrader, Princeton, N. J., assignor to Radio Corporation of America, a corporation of Delaware Application May 26, 1948, Serial No. 29,221

5 Claims. (Cl. 346—33)

This invention relates to improvements in recording volt meters, and more particularly to an improved recording volt meter which meets many different voltage measuring and recording requirements.

A variety of recording volt meters have previously been devised for specific applications, but the flexibility of such instruments has generally been quite limited. While particular instruments have been adequate for their particular purpose, there has been a need for a multi-purpose recording volt meter which would be applicable to more than one measuring problem.

It is, accordingly, one object of the present invention to provide an improved recording volt meter which will measure and record either alternating or direct current potentials.

Another object of the invention is to provide an improved recording volt meter which will record unknown voltages on either a logarithmic or a linear scale.

A further object is to provide a recording volt meter in which there is very little inertia in the recording means, whereby variable voltages may be measured with less chance of error.

Figure 1:
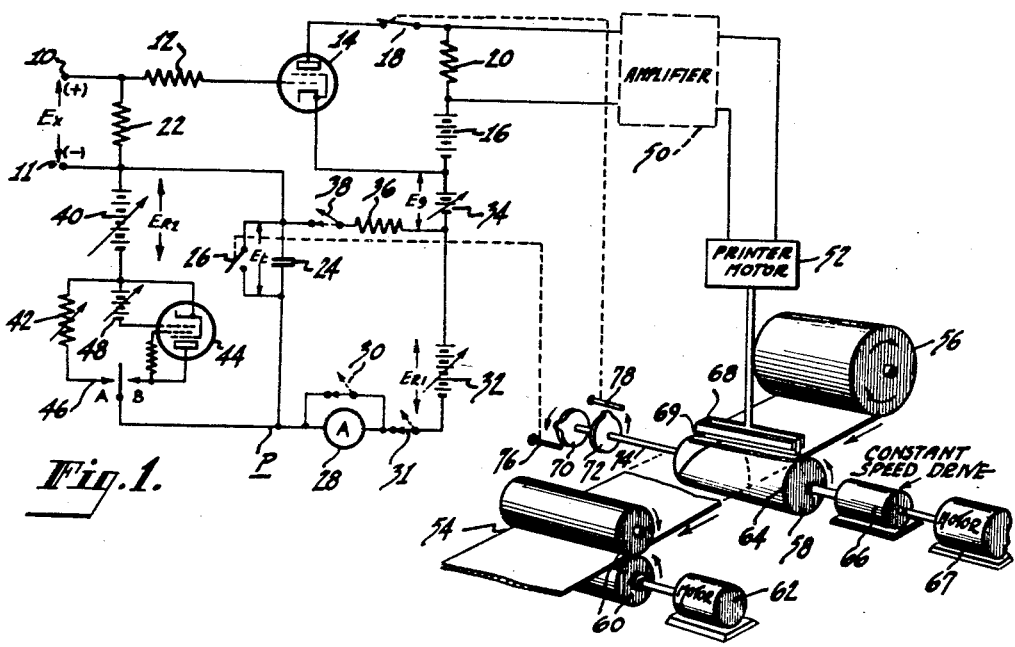
Figure 2A:
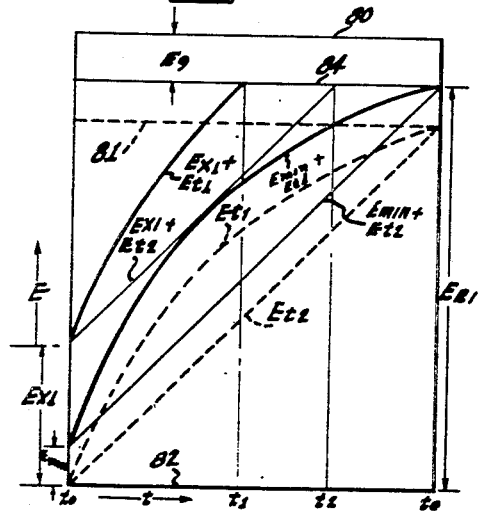
Figure 2B:
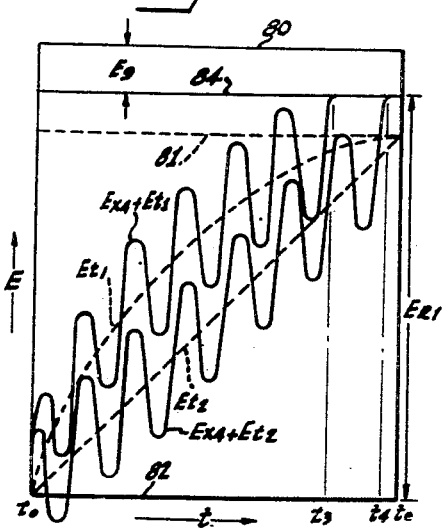
Figure 3:
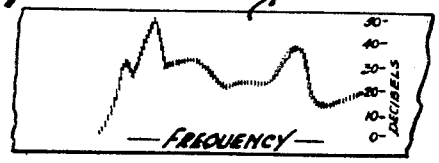

The foregoing and other objects and advantages are attained in a system in which the unknown voltage to be measured is added to a reference voltage which is increasing at a known rate. The time required for the sum of the two voltages to reach a predetermined value is measured and recorded, and from the known rate of increase of the reference voltage, the magnitude of the unknown voltage may be determined. A more complete understanding of the invention may be had by reference to the following description of an illustrative embodiment thereof, when read in connection with the accompanying drawing in which:

Figure 1 is a circuit diagram of a recording volt meter system arranged in accordance with the present invention, Figures 2a and 2b are charts representing graphically the voltage and time relationships for the circuit of Figure 1 during 2 scans of the recorder helix, and, Figure 3 is a typical voltage record produced by the system of Figure 1.

In the circuit of Figure 1, a pair of input terminals 10, 11 is provided, through which an unknown voltage may be applied to the system. An isolating resistor 12 is connected from one of the input terminals 10 to the grid of a gas tube 14. The tube 14 may be any one of a number of well known gas tubes in which the flow of anode current may be started, or "triggered," by variations in grid voltage, whereupon the grid voltage no longer has control of current flow, and the tube must be extinguished by other means, such as cutting off the anode voltage. Other electronic devices, capable of a triggering action, could as well be used in place of the tube 14. The tube 14 is connected to a suitable source of anode voltage 16 through a switch 18 and a load resistor 20.

The grid-to-cathode circuit of the tube 14 is seen to include in series, in the order named, the isolating resistor 12, a resistor 22 connected at opposite ends to the input terminals 10, 11, a capacitor 24 provided with a normally-open shorting switch 26, an ammeter 28 provided with a normally closed shorting switch 30, a switch 31, a variable source of biasing voltage 32, and a second variable source of biasing voltage 34. A resistor 36 and a switch 38 are connected in series between the positive terminal of the potential source 32 and the junction of the resistor 22 and the capacitor 24.

A charging circuit for the capacitor 24 is provided, which is seen to include a variable potential source 40 and either a resistor 42 or a constant current device 44, depending on the setting of a two-position selector switch 46, which is connected to the capacitor 24. The constant current device may be a vacuum tube 44, as shown, of the type in which the magnitude of the anode current remains substantially constant with wide variations of anode potential, or a resistor or other device having the characteristic of constant current for varying voltage drop may be used. A source of biasing potential 48 is connected between the grid and cathode of the tube 44 in order to allow adjustment of the tube current.

The output circuit of the gas tube 14 may be connected to the input terminals of a suitable amplifier 50 which is connected to the printer motor 52 of a recording system, or the output of the gas tube 14 may be connected directly to the printer motor 52 if desired. The printing system, which is shown only in outline form, may be of the type in which a continuous strip of paper 54 is drawn from a supply roll 56 over a scanning roller 58 by driving rollers 60 which are rotated by a feed drive motor 62. The scanning roller 58 is provided with a raised helix 64 of uniform pitch, and is rotated at a constant speed by a suitable constant speed drive 66 which may be driven from a separate motor 67, or which may be coupled to the feed drive motor 62. The printer motor 52 is adapted to respond to pulses of energy derived from the flow of current through the gas tube 14 and passed through the amplifier 50, or to similar pulses coming directly from the tube 14, and to move the printer bar 68 downwardly, against the paper 56. The printer bar 68 is provided with suitable means such as an ink pad 69 or the like, so that a mark will be made on the paper when the bar moves down, the lateral position of the mark being determined by the portion of the helix 64 which is under the bar 68 at the time the mark is made. As the scanning roller 58 rotates, the portion of the helix which is directly under the printer bar will effectively move from left to right across the paper strip, and hence a mark may be made at any point between the edges of the paper strip depending on the elapsed time of the scan during which the mark is made. Since such a printing device is well known and forms no part of the present invention per se, it is believed that the foregoing brief description of its operation will suffice.

As shown in Figure 1, the gas tube anode switch 18 and the capacitor shorting switch 26 are mechanically linked to the scanning roller 58, substantial arrangement being such that the simultaneous opening of the tube switch 18 and closing of the shorting switch 26 will take place at the end of each sweep of the helix. These switching actions deenergize the tube 14 and bring the capacitor voltage to zero between each scan of the helix. However, the tube switch 18 closes shortly before the next sweep of the helix begins, in order that the tube 14 will be ready for firing at any time during the sweep, while the shorting switch 26 opens at the exact time that the next sweep of the helix begins so that the capacitor voltage will begin to rise at the same instant the sweep begins. The switches 18 and 26 may be operated in this sequence in any desired manner, as by cams 70 and 72 mounted on an extension 74 of the shaft of the scanning roller 58. The cams are so oriented on the shaft that the switch control levers 76, 78 will be raised and lowered at the proper times during each scan of the helix 64.

The adjustments to be made in the foregoing circuit will first be stated, and the theory and mode of operation of the circuit will then be explained.

With the bias-adjust switch 38 closed, the switch 31 open, and the tube switch 18 closed, the biasing voltage 34 is varied until the gas tube 14 will fire with only a few hundredths of a volt increase in grid-to-cathode voltage. While the switch 31 is not essential, no current from the sources 32 and 40 can possibly flow through the resistor 36 with the switch 31 open, and this tends to simplify the adjustment of the bias voltage 34. With the bias adjust switch 38 closed, the shorting switches 26 and 30 open, and the switch 31 closed, the potential sources 32 and 40 are adjusted until they are equal to each other (as shown by zero current through the ammeter 28) and approximately equal to the largest expected unknown voltage to be measured. Finally, with the shorting switch 26 open, and the selector switch 46 set to position A, corresponding to logarithmic operation of the system, the resistor 42 is so adjusted that, within the time required for one sweep of the helix, the voltage $E_t$ to which the capacitor 24 will charge, will be less than the charging voltage $E_{r2}$ of the source 40 by an amount equal to the smallest expected unknown voltage. With the selector switch 46 set to position B, corresponding to linear operation, the bias voltage source 48 is adjusted so that, within the time required for one scan of the helix, the voltage $E_t$ to which the capacitor 24 will charge will be less than the charging voltage $E_{r2}$ of the source 40 by an amount equal to the smallest expected unknown voltage. During operation of the system, the bias adjust switch 38 is left open, the meter shorting switch 30 is left closed, and the switch 31 is left closed.

Assuming that the selector switch 46 is moved to position A to arrange the system for logarithmic operation, when the helix 64 starts its sweep, the tube switch 18 will already be closed and shorting switch 26 will open in accordance with the switching sequence described above. Current will begin to flow from the source 40 through the resistor 42, and the capacitor voltage will begin to rise exponentially in accordance with the well known relation $$E_t = E_{r2}\left(1 - e^{-\frac{t}{RC}}\right)$$

wherein:

$E_t$ = the voltage across capacitor 24 at any time $t$ after charging of the capacitor begins
$E_{r2}$ = the voltage of the source 40
$R$ = the resistance of the resistor 42
$C$ = the capacitance of the capacitor 24
$e$ = the base of the Naperian system of logarithms These relationships are represented graphically on the chart of Figure 2a, wherein voltages are plotted as ordinates against time as the abscissa.

In Figures 2a and 2b, the uppermost horizontal lines 80 on the charts represent the cathode voltage level of the gas tube 14. The bias voltage $E_g$ of the source 34 is taken in a negative sense with respect to the cathode of tube 14, and the reference bias voltage $E_{r1}$ is negative with respect to the bias voltage $E_g$. This brings the voltage level for the circuit at the point P (negative terminal of the source 32) to the lowermost horizontal chart lines 82. In the present example (Figure 2a) the exponentially increasing voltage $E_{t1}$ of the capacitor 24 is represented by the broken curved line $E_{t1}$ on the chart. The broken horizontal lines 81 represent the voltage to which the capacitor 24 will be charged during one sweep of the recorder helix. If an unknown voltage $E_{x1}$, of the polarity indicated in Figure 1, is applied through the input terminals 10, 11, across the resistor 22, this unknown voltage $E_{x1}$ will be added to the rising capacitor voltage $E_{t1}$. When the sum of these voltages ($E_{x1}$ and $E_{t1}$) becomes slightly greater than the reference voltage $E_{r1}$ of source 32, then the gas tube 14 will conduct. This is shown on the chart of Figure 2a, as, for example, at the time $t_{t1}$, when the sum of $E_{x1}$ and $E_{t1}$ has become sufficient to reach the horizontal line 84 which represents the grid voltage level for firing the tube 14. If the unknown voltage $E_x$ is approximately equal to the reference voltage $E_{r1}$, then the tube will fire at the beginning of the helix sweep or at the time $t_0$ in Figure 2a. If the unknown voltage is the minimum voltage $E_{min}$ for which the charging rate of the capacitor 24 was adjusted, then the tube 14 will not fire until the end of the helix sweep, or at the time $t_e$ on the chart of Figure 2a. In any case, when the tube 14 fires, a pulse of voltage is developed across the load resistor 20 which will be passed on through the amplifier 50 to the printer motor 52, causing the printer bar 68 to be moved downwardly. A mark will then appear on the paper 54, the distance of the mark from the left edge of the paper being proportional to the elapsed time $t$ in the scanning cycle of the helix. The unit of time $t$ will also be a measure of the sum of the voltage $E_t$ on the capacitor, the source voltage $E_{r1}$, the bias voltage $E_g$, and the unknown voltage $E_x$. Since the capacitor voltage $E_t$ is varying at a known exponential (or logarithmic) rate as was previously described, then it can readily be shown that the distance of the mark from the left edge of the paper 54 is logarithmically related to the sum of the voltages $E_t$, $E_{r1}$, $E_g$, and $E_x$, and hence a logarithmic record of the unknown voltage $E_x$ can be obtained.

When the selector switch 46 is moved to position B for linear operation of the system, the constant current tube 44 will be connected into the charging circuit for the capacitor 24, and the mode of operation of the circuit will be similar to that which has been described for logarithmic readings, except that the capacitor voltage $E_t$ will now vary linearly with time, rather than exponentially, as shown by the broken line $E_{t2}$ in Figure 2a. Thus, in the chart of Figure 2a, if an unknown voltage $E_{x1}$ is to be measured and recorded, the tube 14 will fire at time $t_2$ in the example shown, and the resulting mark on the paper 54 will be spaced from the edge of the paper a distance which is linearly related to the magnitude of the unknown voltage $E_{x1}$. A series of voltage measurements made and recorded with the system in this condition will accordingly give a linear curve rather than a logarithmic curve.

When the unknown voltage is alternating in nature, the operation of the system is not substantially different for either logarithmic or linear operation than it is in the case of D. C. voltages. In the chart of Figure 2b, it has been assumed that an unknown alternating voltage $E_{x4}$ is being applied to the input terminals of the system during a scan of the recorder helix. The unknown voltage $E_{x4}$ is added to the capacitor voltage $E_{t1}$ or $E_{t2}$, depending on the setting of the selector switch 46, and the tube 14 will fire at a time $t_3$ or $t_4$ when the sum of the unknown voltage and the capacitor voltage reaches the necessary level represented by the line 84 in Figure 2b. It will be noted that some care must be taken in the interpretation of records of alternating voltages, since the tube 14 may not always be fired exactly at the peak of the unknown wave. For alternating voltages having a period substantially less than that of the helix scan, this ambiguity vanishes, and the record quite faithfully represents the positive peak voltage. The possible deviation decreases rapidly with increasing frequency of the unknown voltage.

In Figure 3, a typical record made by a recording volt meter of the described type is shown. The record is for the frequency response of a loudspeaker system, and represents a series of voltage readings taken at different frequencies, using the logarithmic setting of the selector switch 46. The logarithmic readings of voltage are shown plotted on a scale of decibels, with frequency as the abscissa reference.

Many modifications and adaptations of the system herein shown and described can be readily arranged. For example, if it is desired to make both a logarithmic and a linear record of an unknown voltage, the selector switch can be automatically reversed in synchronism with the helix scan, so that logarithmic and linear readings are obtained on alternate helix scanning cycles. Also, the circuit shown and described could be used in a system wherein a device other than a recorder would be actuated when the sum of the input voltage and the capacitor voltage reached a predetermined level. The time of actuation would then be dependent on the magnitude of the voltages involved, and could be controlled as desired by varying the magnitude of the input voltage. Other possible variations in the system within the scope and spirit of the invention will be readily apparent to those skilled in the art, and the foregoing description is therefore to be construed as illustrative, and not in a limiting sense.

What is claimed is:

1. In a voltage measuring system, in combination, a source of voltage of known magnitude, a capacitor, circuit means connecting said capacitor in parallel with said voltage source to charge said capacitor at a known predetermined rate, a resistor, a pair of input terminals connected to opposite ends of said resistor, a second voltage source, a circuit connecting said resistor and said capacitor in series to add to the voltage developed across said capacitor an unknown voltage applied across said resistor through said terminals, said second voltage source also being connected in series in said last named circuit and in opposite polarity to the voltage developed across said capacitor, and means connected to opposite ends of said last named circuit to measure and record the time required for the sum of said unknown and said capacitor voltages to equal the voltage of said second source as a measure of the magnitude of said unknown voltage.

2. A system as defined in claim 1 wherein said circuit means includes a resistor, a constant current device, and a switch selectively to charge said capacitor either through said constant current device at a known linear rate or through said resistor at a known exponential rate.

3. A system as defined in claim 1 wherein said measuring means includes an electron discharge device having a grid, an anode and a cathode, said series circuit being connected from said grid to said cathode, and wherein said measuring means further includes a recorder device connected in the anode circuit of said electron discharge device.

4. In a voltage measuring system, in combination, a gas-filled tube having a cathode, a grid and an anode, an input circuit for voltages to be measured, a capacitor, a variable voltage source of known magnitude, said circuit, said capacitor and said source being connected in series in the order named between said grid and said cathode, a second voltage source of known magnitude, circuit means including first and second elements connected to said second voltage source and selectably connectable to said capacitor to charge said capacitor either at a known linear rate or at a known exponential rate, a recording device connected to said tube having a periodically repeating operating cycle and responsive to conduction in said tube to produce a record representative of the time at which said tube first conducts current during any cycle of operation of said recording means, means including a switch operatively associated with said recording means for supplying anode voltage to said tube only during the cycles of operation of said recording means, and means including a switch operative in synchronism with said recording means for shorting said capacitor between cycles of operation of said recording means.

5. In a voltage measuring system, in combination, a gas filled tube having a cathode, a grid and an anode, a series connected grid-to-cathode circuit for said tube including, in the order named, (1) an input circuit for voltages to be measured, (2) a capacitor, and (3) a variable source of voltage of known magnitude, charging means for said capacitor including (1) an additional source of voltage of known magnitude, (2) a resistor, and (3) a constant current device, means for selectively establishing a charging circuit between said capacitor and said source of charging voltage either through said resistor or through said constant current device, and recording means responsive to conduction in said tube for producing a record representative of the times at which said tube conducts.

ROSS E. SHRADER.

REFERENCES CITED

The following references are of record in the file of this patent:

UNITED STATES PATENTS

| Number | Name | Date |
|---|---|---|
| 2,228,883 | Morgan | Jan. 14, 1941 |
| 2,477,062 | Jacobi | July 26, 1949 |